Figure 1:
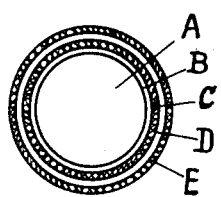
Figure 2:
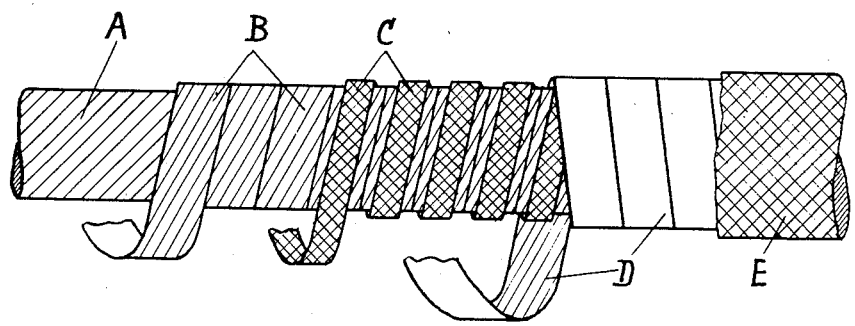

July 23, 1929.    H. MEURER ET AL    1,722,153
HIGH TENSION CABLE
Filed Aug. 6, 1928

H. Meurer &
S. Silbermann
INVENTORS

Patented July 23, 1929.

1,722,153

UNITED STATES PATENT OFFICE.

HANS MEURER, OF COLOGNE, AND SALMAN SILBERMANN, OF COLOGNE-PORZ, GERMANY, ASSIGNORS TO FELTEN AND GUILLEAUME CARLSWERK ACTIENGESELLSCHAFT, OF COLOGNE-MULHEIM, GERMANY.

HIGH-TENSION CABLE.

Application filed August 6, 1928, Serial No. 297,778, and in Germany September 5, 1927.

In high tension cables metallic insertions are frequently used, for instance for the purpose of producing a certain potential distribution inside the insulation, more particularly when such cables are to be used as condensers. These conductive insertions must on the one hand be made as thin as possible so as not unduly to increase the diameter of the cable, and on the other hand, they must have a sufficient conductivity so as not to be excessively heated by the charging currents flowing through them. Finally the conductive insertions must allow the impregnating material to penetrate during the impregnating process.

The present invention has for its object to provide a high tension cable in which the conductive insertions consist of two metallized paper bands, the metallic surfaces of which face one another, and of a thin band of a good-conducting material lying between the said paper bands. The metallized papers should be perforated and are preferably wrapped on in the same spiral wrapping by the same machine as the band like paper insulation, the two being preferably wrapped on in opposite directions. The good-conducting band may be made of copper and its thickness depends on the probable strengths of the loading currents, amounting in some cases to only a fraction of a millimeter. The width of the metal band will suitably be only a portion (for instance ½) of the width of the metallized paper and the band is wrapped on with the same length of lay as the metallized paper so that the separate convolutions of the metal band do not abut against one another, a gap remaining between them for enabling the impregnating material to penetrate.

In the accompanying drawing a constructional example of a high tension cable is shown, in which a metallic insertion according to the present invention is used. On the insulating layer A is wrapped a metallized paper band B; on the latter, wound to the same helix is a copper strip C of half the width of the metallized paper band and on the copper strip C, wrapped on in the opposite direction, is a strip of metallized paper D, the metallized surface of which faces the copper band C. On the band D are wrapped further layers of insulation E.

What we claim is:

1. A high tension cable having between the layers of insulation two wrappings of metallized paper band, having the metallized surfaces facing one another, and between the said metallized bands a wrapped on band of good-conducting material, as and for the purpose set forth.

2. A high tension cable having between the layers of insulation two oppositely wrapped layers of metallized paper, having the metallized surfaces facing one another, and between the said metallized bands a wrapped on band of good-conducting material, as and for the purpose set forth.

3. A high tension cable having between the layers of insulation two wrappings of metallized paper band, having the metallized surfaces facing one another, and between the said metallized bands a wrapped on band of good-conducting material, the width of which band is less than that of the metallized paper bands, as and for the purpose set forth.

In testimony whereof we have signed our names to this specification.

HANS MEURER.
SALMAN SILBERMANN.